No. 697,079. Patented Apr. 8, 1902.
G. H. EVERSON.
METALLIC WHEEL.
(Application filed Apr. 19, 1901.)
(No Model.)
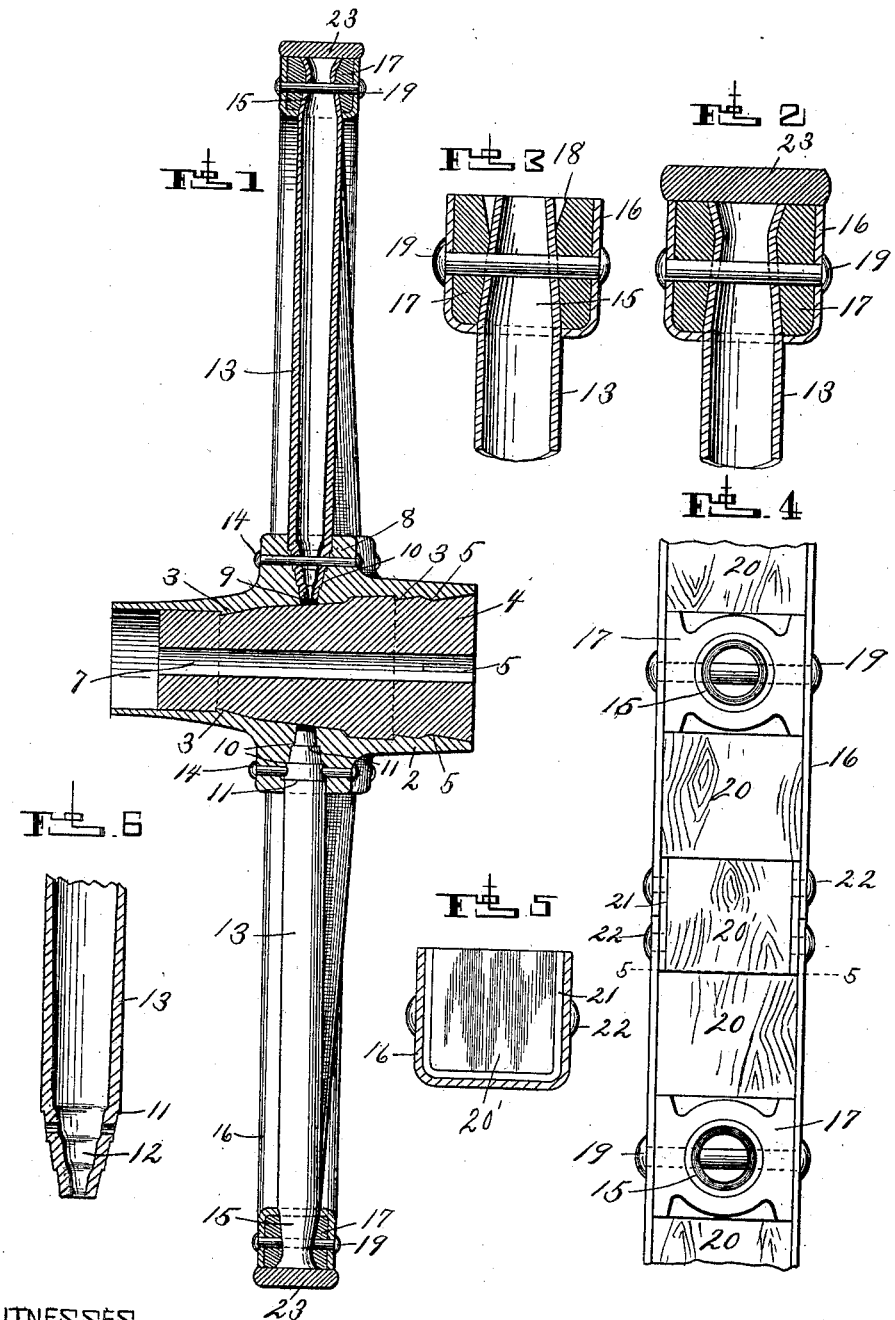
WITNESSES
J. R. Keller
Alex. D. Mabon
INVENTOR
Geo. H. Everson
By J. W. Herbit
Atty.

UNITED STATES PATENT OFFICE.

GEORGE H. EVERSON, OF PITTSBURG, PENNSYLVANIA.

METALLIC WHEEL.

SPECIFICATION forming part of Letters Patent No. 697,079, dated April 8, 1902.

Application filed April 19, 1901. Serial No. 56,575. (No model.)

*To all whom it may concern:*

Be it known that I, GEORGE H. EVERSON, a citizen of the United States, residing at Pittsburg, in the county of Allegheny and State of Pennsylvania, have invented certain new and useful Improvements in Metallic Wheels, of which the following is a specification, reference being had therein to the accompanying drawings.

This invention relates to metallic vehicle-wheels; and the primary object is to combine durability, strength, and lightness in a type of wheel which may be constructed in a variety of sizes for both light and heavy vehicles.

The invention embodies spokes formed of metal tubes and includes improved means for securing the spokes in the hub and also in the felly.

The invention also includes a hub and a felly, each of improved construction.

The invention consists in the novel structural features and combination of parts hereinafter fully described and claimed, and illustrated by the accompanying drawings, wherein—

Figure 1 is a sectional view of a wheel embodying my improvements. Fig. 2 is a cross-sectional view of the felly, tire, and one of the spokes. Fig. 3 is a similar view of the felly and one of the spokes before the extremity of the latter has been expanded. Fig. 4 is a plan view of a portion of the wheel-periphery with the tire removed. Fig. 5 is a cross-sectional view on line 5 5 of Fig. 4. Fig. 6 is a detail view of the hub end of one of the spokes.

Referring to the drawings, 2 represents the metallic hub, having its tapered bore formed with the annular offsets or shoulders 3, and 4 is a tapered wood filler which is driven into the hub-bore, which is impinged by the shoulders 3, and thereby held permanently against backward displacement. Rotation of the filler within the hub is prevented by the rib projections 5 at or adjacent the inner end of the hub. With the exception of the mandrel-passage 7 the filler or inner hub remains unbored until the spindle-box of desired size is fitted therein by the wheelwright. Thus the wheel may be adapted to a great variety of boxes and spindles.

The periphery of the hub is formed with the ridge or enlargement 8, which is cast with a succession of inwardly-tapering core openings or sockets 9, the latter being subsequently reamed out to form the shoulders or steps 10. These shoulders form abutments for the annular offsets 11 on the inner tapered ends 12 of the tubular spokes 13. In this manner the spokes are solidly and permanently seated in the hub, being secured against outward displacement by the rivets 14, extending transversely through the spokes and the hub-ridge 8. The outer ends 15 of the spokes are also tapered, as shown in Fig. 3.

The interiors of the tubular spokes are slightly tapered, the metal being thicker in cross-section at the hub ends, where the greatest strength is required, than at the felly ends.

The felly 16 is formed of a metallic plate, which is bent up to U form in cross-section to constitute a channel-rim of sufficient depth and is drilled to receive the outer ends of the spokes. Fitting within the rim or felly are the metallic heads 17, formed with openings to receive the tapered ends 15 of the spokes. The inner portions of these head-openings are formed complementary with said tapered spoke ends, while the outer portions thereof are reversely tapered, as shown at 18, Fig. 3. After each spoke has been positioned in the felly and in head 17 a rivet 19 is passed transversely through the felly, head, and spoke, thereby securely uniting all of said parts. A suitable expanding-tool is then applied to the tapered extremity of the spoke, expanding and outwardly flaring the same to fill the outer portion 18 of the head-opening. The extremity of each spoke is thus reversely tapered within the securing-head opening of corresponding form, so that it is absolutely impossible for the rim ends of the spokes to loosen. Fitting within the U-shaped felly, between adjacent heads 17, are the wood-filler blocks 20. In Fig. 4 is shown the coupling for the rim extremities, which consists of a short section 21, of U-shaped metal, fitting within the U-shaped felly and overlapping the joint and secured by rivets 22. At this point filler-blocks 20 are shorter, reaching only to coupling 21 and abutting against a short filler-section 20', fitting said coupling.

The tire 23 may be secured to the felly in any suitable manner.

The wheel may be constructed with the spokes staggered, as in Fig. 1, or they may be arranged in a common plane. In addition to the advantageous features of the wooden inner hub or filler heretofore referred to it constitutes a cushion for the wheel and spindle, relieving the latter of much of the impact which otherwise would be communicated thereto, owing to the rigidity of the metal wheel. The felly is light and of inexpensive construction and is fully as strong and durable as though formed of solid metal. In the tubular spokes are combined great strength and durability, and at the same time they contribute to the formation of a light-weight wheel.

While the several elements of the improvement are here shown combined in a single wheel, it will be understood that they may be used together or separately.

Having thus fully described my invention, what I claim as new, and desire to secure by Letters Patent, is—

1. The combination of a wheel-felly formed with spoke-openings, said openings being inwardly tapered from their opposite ends, and tubular spokes tapered at their outer ends to fit the inner tapered ends of said openings, the extremities of the tapered spoke ends being flared or expanded to fit the outer tapered portions of said felly-openings, substantially as shown and described.

2. The combination of a wheel-felly formed with spoke-openings, each of said openings being inwardly tapered from opposite ends and having its smallest diameter at or about the center of the felly, tubular spokes tapered at their outer ends and fitting the inner tapered portions of the felly-openings, the extremities of the tapered spoke ends being flared or expanded to fit the outer tapered ends of said felly-openings, and rivets extending transversely through the tapered spoke ends and centrally through the felly, substantially as shown and described.

3. In a wheel, the combination of tubular metallic spokes having tapered inner and outer ends, a hub formed with inwardly-tapering depressions to receive the tapered inner ends of the spokes, and a felly formed with outwardly-tapering openings to receive the outer tapered ends of the spokes, substantially as shown and described.

4. A metallic hub having its bore formed with inwardly-extending shoulders, a wood filler adapted to be driven into the hub-bore and be confined by being impinged by said shoulders, the hub being formed with spoke depressions having inward offsets, and spokes fitting the depressions and formed with offsets complementary therewith, substantially as shown and described.

5. The combination of a hollow metallic felly, heads secured therein having tapering recesses, and spokes tapered complementary with and secured in the heads, substantially as shown and described.

6. The combination of a hollow metallic felly, hollow heads secured therein, the head depressions being inwardly tapered from opposite sides of the head, and spokes tapered at the end to fit one portion of said tapered depressions, the extremities of the spokes being flared or expanded to fit the oppositely-tapered portions of said head depressions, substantially as shown and described.

7. The combination of a felly formed with spoke-receiving openings, said openings being inwardly tapered from opposite ends, and tapered spokes adapted to fit the inner tapered portions of said openings, the extremities of the spokes being flared or expanded to fit the outer tapered portions thereof, substantially as shown and described.

8. The combination of a hub formed with spoke depressions having annular offsets, tubular spokes tapered at their opposite ends, the inner tapered ends of the spokes being formed with offsets complementary with the hub-depression offsets which they closely fit, a rim having spoke-receiving openings, said openings being inwardly tapered from opposite ends, the tapered outer ends of the spokes fitting the inner tapered portions of said depressions, and the spoke extremities expanded or flared to fit the outer tapered portions of the openings, substantially as shown and described.

In testimony whereof I affix my signature in presence of two witnesses.

GEORGE H. EVERSON.

Witnesses:
J. M. NESBIT,
ALEX. S. MABON.